(12) United States Patent  (10) Patent No.: US 6,677,526 B2
Kishizawa  (45) Date of Patent: Jan. 13, 2004

(54) PROTECTOR FOR WIRE HARNESS (75) Inventor: Hidenori Kishizawa, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/375,338

(22) Filed: Feb. 27, 2003

(65) Prior Publication Data

US 2003/0173102 A1 Sep. 18, 2003

(51) Int. Cl.[7] .................................................. H02G 3/04
(52) U.S. Cl. .................... 174/68.1; 174/68.3; 174/72 A
(58) Field of Search ...................... 174/48, 68.1, 68.3, 174/72 A, 97, 96, 72 C, 70 C, 135; 52/220.3; 439/34

(56) References Cited

U.S. PATENT DOCUMENTS

| 4,811,922 A | * | 3/1989 | Yoneyama | 248/73 |
| 4,918,261 A | * | 4/1990 | Takahashi et al. | 174/135 |
| 5,905,231 A | * | 5/1999 | Houte et al. | 174/68.3 |
| 6,417,451 B1 | * | 7/2002 | Uchiyama | 174/72 A |
| 6,504,101 B2 | * | 1/2003 | Kondoh | 174/135 |

* cited by examiner

Primary Examiner—Dhiru R Patel
(74) Attorney, Agent, or Firm—Harness, Dickey & Pierce, P.L.C.

(57) ABSTRACT

A protector (10) is secured to a vehicle body member by clips (12). A wire harness is inserted into a protector body (11) having a concave configuration in cross section and an opening at an upper side. At least one of the clips (12) is separate from the protector body (11). The clip (12) includes a base plate (12e), a pole (12d) projecting from the base plate (12e), and a pair of engaging wings provided on the top of the pole (12d). The protector body (11) includes a guide frame (17) having a U-shaped cross section on each of its opposite sidewalls. The guide frames (17) oppose one another. The opposite ends of the base plate (12e) of the clip (12) are slidably inserted into the guide frames (17). The ends close the opening in the protector body (11) and adjust a position of the clip with respect to an engaging hole in the vehicle body member. The protector (10) includes a plurality of thin hinges (16) so that the protector (10) can be bent at plural positions.

10 Claims, 7 Drawing Sheets

PROTECTOR FOR WIRE HARNESS

CROSS REFERENCE TO RELATED APPLICATION

The entire disclosure of Japanese Patent Application No. 2002-071593 filed on Mar. 15, 2002 including the specification, claims, drawings and summary is incorporated herein by reference in its entirety.

FIELD OF THE INVENTION

This invention relates to an automobile vehicle wire harness protector and, more particularly, to a protector for a wire harness that can be attached through clips to a bent vehicle body member to absorb dimension errors even if the positions of the clips are shifted from the positions of the engaging holes in the vehicle body member.

BACKGROUND OF THE INVENTION

Heretofore, a protector mounted on a wire harness was secured to a vehicle body to define and protect the wire harness.

Figure 9:
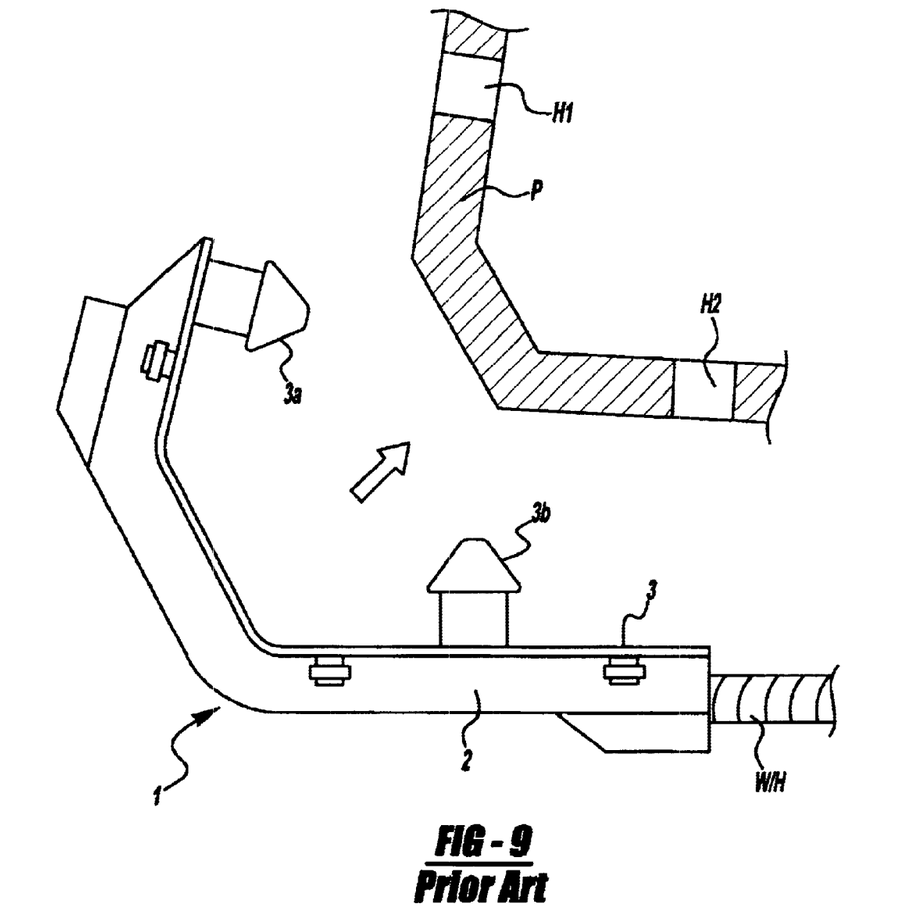
FIG. 9 is a side elevation view of a conventional protector for a wire harness.

For convenience of explanation, a prior art protector for a wire harness is described with reference to FIG. 9. FIG. 9 is a side elevation view of a conventional protector for a wire harness.

For example, as shown in FIG. 9, a protector body 2 is formed into a substantially J-shaped configuration corresponding to a bent configuration of a vehicle body member. A wire harness W/H is inserted into the protector body 2 and a lid 3 is mounted and locked on a protector 1. Two clip sections 3a and 3b are formed integrally with the lid 3 of the protector 1. The clip sections 3a and 3b are inserted into and engage with engaging holes H1 and H2 in a vehicle body P. If only one clip section 3a or 3b is provided on the lid 3, the protector 1 may be rotated about the clip section 3a or 3b. This makes it difficult to position the protector 1 on the vehicle body P.

However, since the clip sections 3a and 3b are formed integrally with the lid 3, the distance is fixed between the clip sections 3a and 3bd. Consequently, if a large dimension tolerance occurs between the lip sections 3a and 3b and the engaging holes H1 and H2, the positions of the clip sections 3a and 3b are shifted. Thus, the positions of the engaging holes and the clip sections do not align and the clip sections cannot be inserted into the engaging holes.

In the case where the vehicle body P has a bent configuration, as shown in FIG. 9, when one clip section 3b of the protector 1 is engaged with one engaging hole H2 in the vehicle body P, it may be difficult to engage the other clip section 3a with the other engaging hole H1 due to the structure of the vehicle body P. Thus, it may be very difficult to attach the protector 1 to the vehicle body P. Consequently, a worker will forcedly deflect the protector 1 to insert the clip section 3a into the engaging hole H1. This will lower the working efficiency of the protector.

SUMMARY OF THE INVENTION

In view of the above problems, it is an object of the present invention to provide a protector for a wire harness that can be attached to a vehicle body member and, in particular, to a bent vehicle body member. The protector absorbs dimension errors even if large dimension tolerances exist between the clips and the engaging holes. The position of the clips may be shifted to engagement positions to engage engaging holes in the vehicle body member.

In order to achieve the above object, the present invention provides a protector for a wire harness that is secured to a vehicle body member by more than two clips. The wire harness is inserted into a protector body with a concave configuration in cross section and has an opening at an upper side. The protector for the wire harness has at least one of the clips separated from the protector body. Each of the clips includes a base plate, a pole standing up on the base plate, and a pair of engaging wings provided on the top of the pole. The protector body is provided on each of the opposite sidewalls with a guide frame having a U-shaped cross section. The guide frames oppose one another. The opposite ends of the base plate of the clip are slidably inserted into the guide frames. The opposite ends close the opening in the protector body. The clip is adjustable with respect to an engaging hole in the vehicle body member.

According to the above construction, since the separate clips are slidably attached to the protector body, even if large dimension errors exist between the engaging holes in the vehicle body member, it is possible to attach and adjust the clips to the vehicle body member by sliding the clips so that the distance between the clips accords with the distance between the engaging holes. Accordingly, it is possible to enhance efficiency of attaching the protector to the vehicle body.

The base plates of the clips close the upper opening in the concave configured cross section protector body after the wire harness is inserted into the protector body. Thus, the clips serve to prevent the wire harness from coming out of the protector body.

Two or more separate clips may be added to the protector body. One of the two clips may be separate from the protector and slidably attached on the protector. The other clip may be integral with the protector body. Also, the other clip may be separate from the protector body so that the other clip is fixed to the protector body.

The protector body includes a plurality of opening and closing lids integrally connected through thin hinges to the protector body. The lids oppose the protector body. When the lids are locked on the protector body, clearances are defined between the base plates of the clips and the lids which enable the base plates to slide in the guide frames. The lids serve as stoppers for the base plates of the clips that slide in the guide frames.

According to the above construction, it is possible to prevent the clips slid into the guide frames from coming out of the guide frames by the adjacent lid when the lid is mounted and locked on the protector body. At the same time, the clearance between the base plate of the clip and the lid enables the clip to slide on the protector in a longitudinal direction. It is possible to insert the clip into the engaging hole in the vehicle body member while finely adjusting the position of the clip in accordance with a distance between the engaging holes.

Each of the base plates of the clips includes a protrusion on the bottom surface. The protrusion comes to a point contact with a lower surface of each of the guide frames. Thus, the clips can slide in the guide frames in a point contact manner.

The guide frames are tapered at their inlet port sides. This prevents the base plate of each clip from coming out of the guide frames in a horizontal direction.

The protector body has a bottom wall with a plurality of thin hinge sections that are spaced away from one another in a longitudinal direction. The protector body can be bent at the thin hinge sections. The clips are disposed between the thin hinge sections on the protector body. Thus, since the plural thin hinge sections are provided on the protector body so that the protector body is bent at plural positions, it is possible to flexibly attach the protector to the vehicle body in compliance with the bent configuration. This enhances attachment efficiency of the protector. Further, since it is possible to manipulate the protector body to follow any bent configuration of the vehicle body at the thin hinge sections, the types of protectors can be reduced.

The vehicle body member for supporting the clips includes a stationary element, a movable element relative to the stationary element, and a bendable link connected between the stationary element and the movable element. The protector body thin hinge section is bent in compliance with movement of the link.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the drawings, an embodiment of a protector for a wire harness in accordance with the present invention will be described below.

Figure 1:
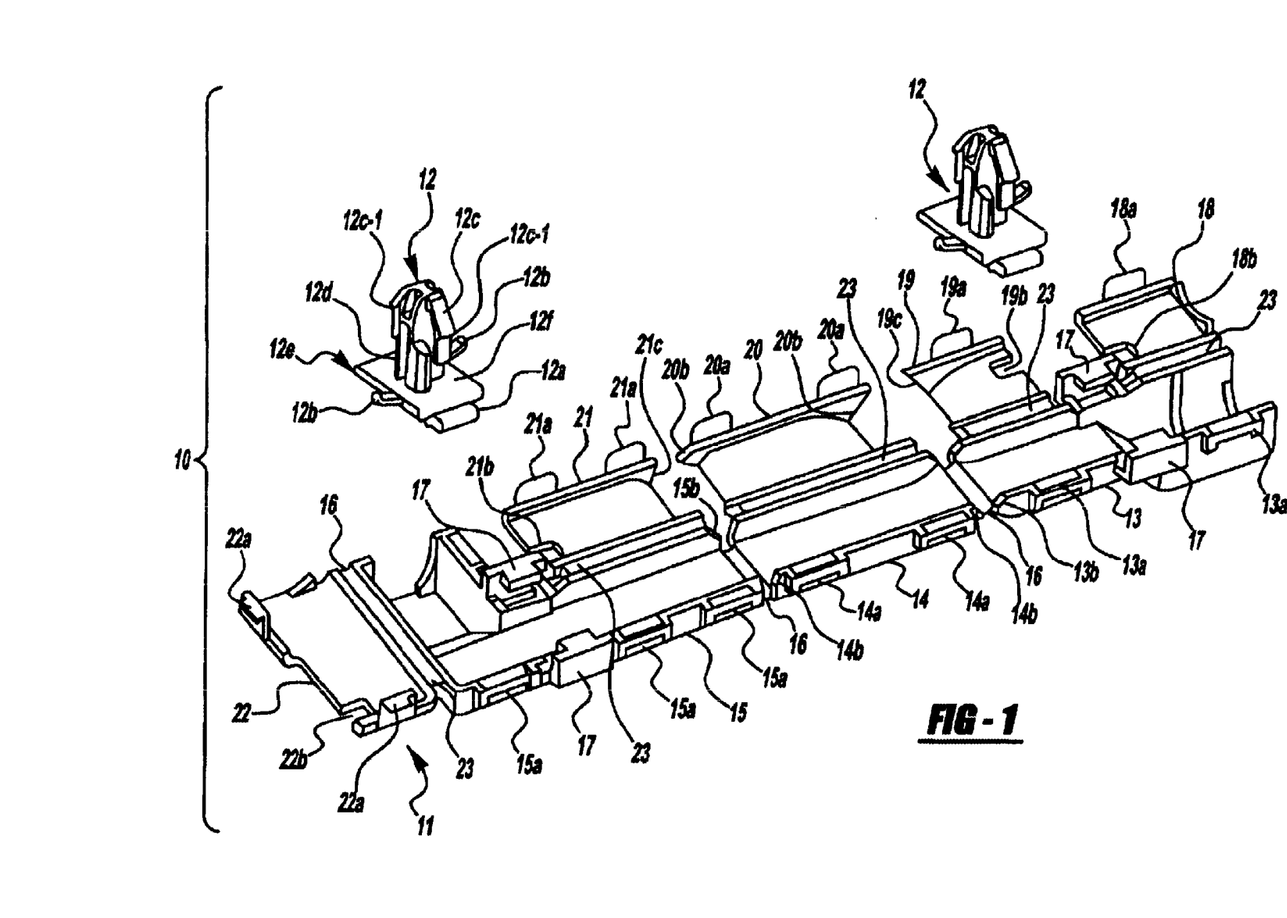
FIG. 1 is a perspective view of a first embodiment of a protector for a wire harness in accordance with the present invention.

FIG. 1 is an embodiment of a protector 10 for a wire harness in accordance with the present invention. The protector 10 includes a protector body 11, made of a synthetic resin material, and clips separated form the protector body 11. The clips are also made of a synthetic resin material.

The protector body 11 includes a first body section 13, a second body section 14, a third body section, 15, thin hinge sections 16, a first lid section 18, a second lid section 19, a third lid section 20, a fourth lid section 21, a fifth lid section 22, and thin hinges 23. The first through third body sections 13 through 15 have U-shaped cross-sections (concave configuration). The first through fifth lid sections 18 through 22 have reversed U-shaped cross-sections. The thin hinge sections 16 interconnect the bottom ends of the first, second, and third sections 13, 14, and 15. The thin hinges 23 connect the first and second lid sections 18 and 19 to a sidewall of the first body section 13. Also, thin hinge 23 connects the third lid section 20 to a sidewall of the second body section 14. Further, thin hinge 23 connects the fourth and fifth lid sections 21 and 22 to sidewalls of the third body section 15. The third body section 15 has a substantially L-shaped configuration. Thus, the protector body 11 has a generally L-shaped configuration.

The first, second, and third body sections 13, 14, and 15 include locking frames 13a, 14a, and 15a on given positions of sidewalls opposed to the first, second, third, fourth, and fifth lid sections 18, 19, 20, 21, and 22. The first, second, third, fourth, and fifth lid sections 18, 19, 20, 21, and 22 are on corresponding positions with locking pieces 18a, 19a, 20a, 21a, and 22a.

A wire harness W/H enters the first, second, and third body sections 13, 14, and 15. The first, second, third, fourth, and fifth lid sections 18, 19, 20, 21, and 22 are mounted onto the first, second, and third body sections 13, 14, and 15 to close their openings. The locking pieces 18a, 19a, 20a, 21a, and 22a enter the locking frames 13a, 14a, and 15a. Engaging pawls 18a-1 on outer surfaces of the locking pieces 18a, 19a, 20a, 21a, and 22a lock with the locking frames 13a, 14a, and 15a.

Figure 3:
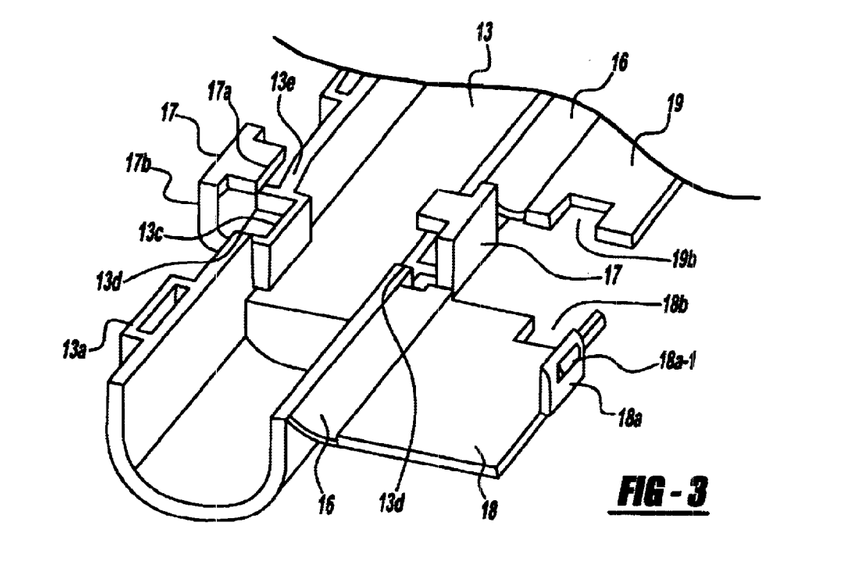
FIG. 3 is a perspective view of a main part of a protector body.

The first and second body sections 13 and 15 include a pair of guide frames 17 opposing one another. The guide frames 12 have U-shaped cross-sections. Opening sides of the guide frames 17 are opposed to each other. As shown in FIG. 3, a smoothly inclined portion 13e is formed between a bottom portion 13c of the guide frame 17 and an adjacent sidewall. A stepped portion 13d is formed between the other adjacent sidewall and the bottom portion 13c.

The first and second lid sections 18 and 19 are provided with cut-off portions 18b and 19b. The cut-off portions 18b and 19b oppose one another and along with the guide frames 17 receive elastic pieces 12b. Similarly, the fourth and fifth lid sections 21 and 22 include opposing cut-off portions 21b and 22b adjacent the guide frames 17.

End portions 19c, 20b, and 21c, opposed to the thin hinge sections 16 of the second, third, and fourth lid sections 19, 20, and 21, are formed into tapered portions. Thus, spaces are formed at the end portions 19c, 20b, and 21c and extend upwardly when the second, third, and fourth lid sections 19, 20, and 21 are mounted on the first, second, and third body sections 13, 14, and 15. Similarly tapered portions 13b, 14b, and 15b are formed on end portions of the opposite sidewalls of the first, second, and third body sections 13, 14, and 15. The tapered portions 13b, 14b, 15b are continuous with the end portions 19c, 20b, and 21c when the second, third, and fourth lid sections 19, 20, and 21 are mounted on the first, second, and third body sections 13, 14, and 15.

Figure 2:
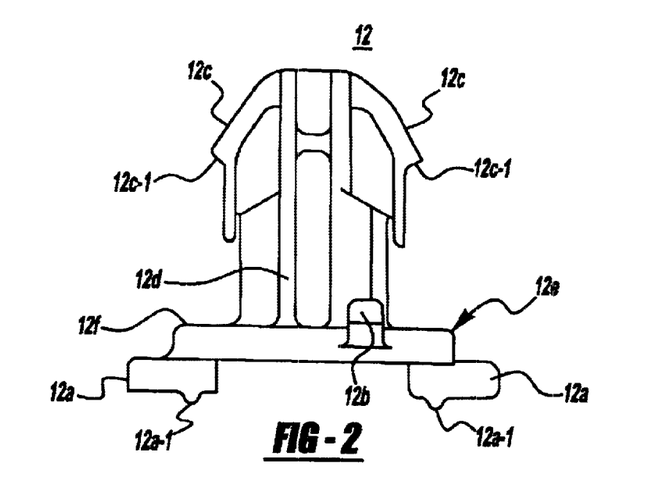
FIG. 2 is a side elevation view of a clip.

The clip 12, as shown in FIGS. 1 and 2, includes a base plate 12e and a quadrangle base portion 12f. A pair of guide pieces 12a extend from each sidewall at the lower end of the quadrangle base portion 12f in an offset manner. A pole 12d projects from a central position of the quadrangle base portion 12f. Engaging wings 12c extend outwardly from the distal end of the pole 12d. The wings 12c have engaging pawls 12c-1 at the outer surface of the pole. A pair of slant elastic pieces 12b extend from the quadrangle base portion 12f. Protrusions 12a-1 each project from the bottom surface of the guide piece 12a.

Next, a process for attaching the clip 12 to the protector body 11 will be explained below.

Figure 4:
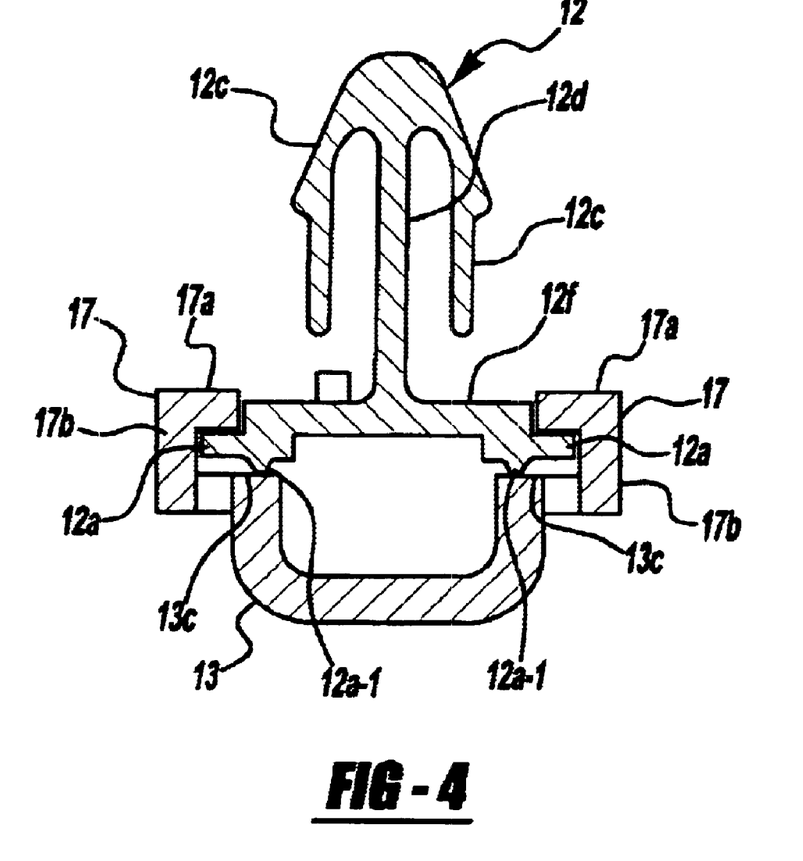
FIG. 4 is a cross section view of the protector to which the clip is attached.

By the way of an example, the case where the clip 12 is attached to the first body section 13 is explained. The wire harness W/H is inserted into the first, second, and third body sections 13, 14, and 15. The pair of guide pieces 12a of the clip 12 are slid into the guide frames 17 through the smooth slant portions 13e. At this time, the stepped portion 13c prevents the guide pieces 12a from coming out of the guide frames 17. Since the slant portions 13e serve as inlet ports for the guide pieces 12a of the base plate 12e, the guide pieces 12a are not readily removable from the guide frames 17 even if the base plate 12e slides horizontally after inserting the clip 12. When guide pieces 12a of the clip 12 are slid into the guide frames 17, as shown in FIG. 4, the protrusions 12a-1 project from the bottom surfaces of the guide pieces 12a come into a point contact with the bottom surface 13c. Consequently, the frictional resistance is decreased to cause a smooth sliding movement.

When the first and second lid sections 18 and 19 are mounted on the first body section 13, the locking pieces 18a and 19a engage the locking frames 13a. The end portions of the first and second lid sections 18 and 19 serve as stoppers that prevent the clip 12 from coming out of the guide frames 17. Since a distance between the end portions of the first and second lid sections 18 and 19 is larger than the width of the clip 12 by a clearance S, the clip 12 can be slightly moved in a direction shown by an arrow in FIG. 5 to finely adjust a position of the clip 12.

Figure 5:
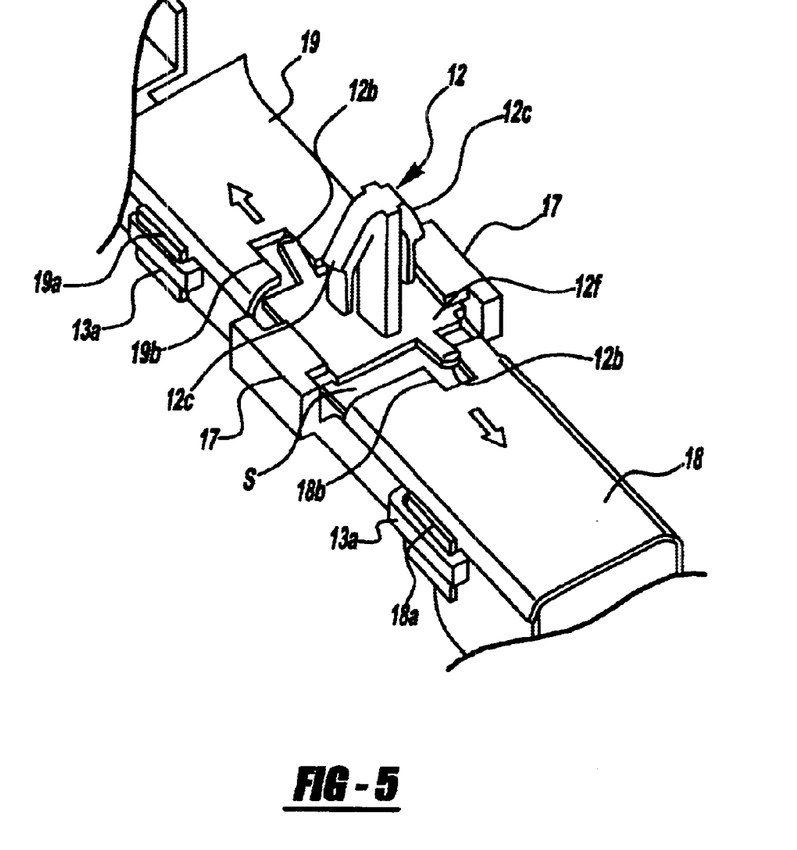
FIG. 5 is a perspective view of a main part of the protector to which the clip is attached.

The elastic pieces 12b that project from the quadrangle base portion 12f of the clip 12 are disposed in the cut-out portions 18b and 19b in the first and second lid sections 18 and 19. The distal ends of the elastic pieces 18b and 19b are arranged at positions slightly higher than the upper surfaces of the first and second lid sections 18 and 19.

Figure 6A:
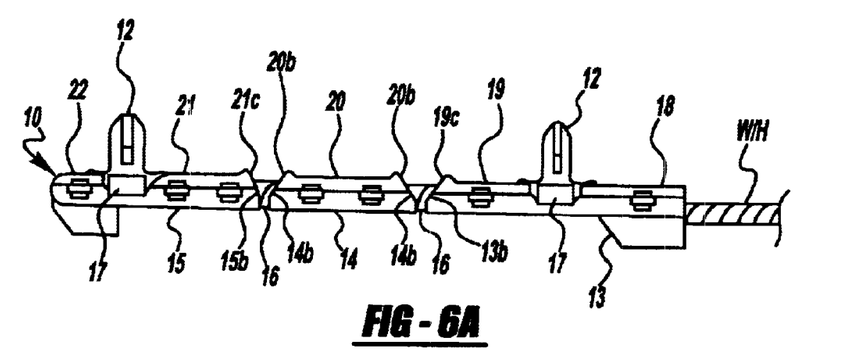
FIG. 6A is a side elevation view of the protector that covers a wire harness.

The above procedure can be applied to the case where the other clip 12 is attached to the third body section 15. FIG. 6A shows the protector 10 that is mounted on the wire harness W/H by the above procedure.

Figure 6B:
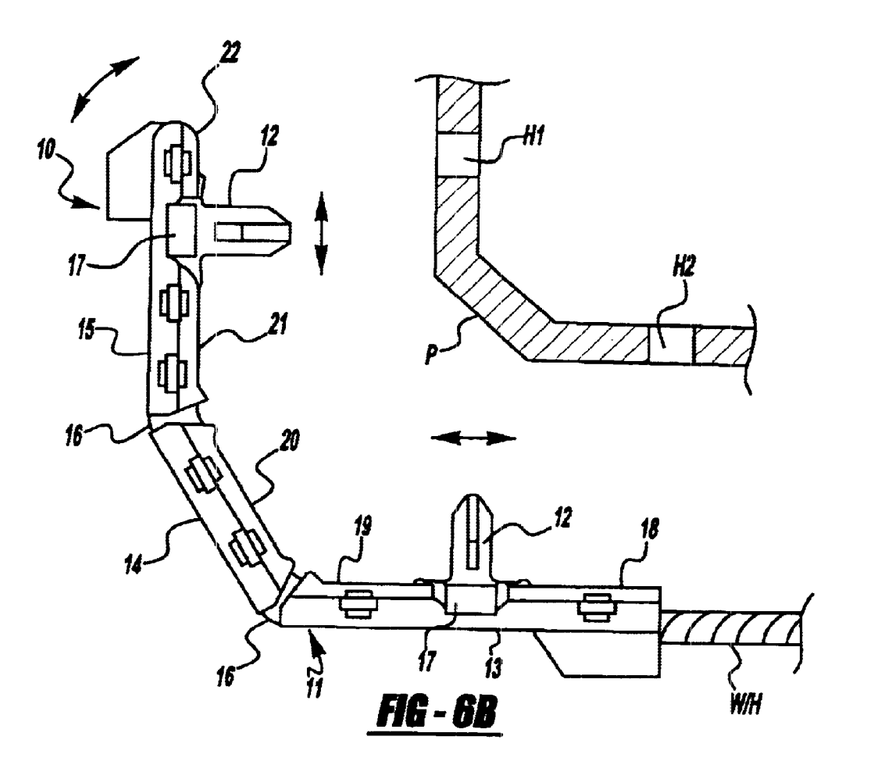
FIG. 6B is a side elevation view of the protector shown in FIG. 6A, illustrating an operation of attaching the protector to a vehicle body.

The protector 10 is to be attached to a member of a vehicle body P that is bent at two positions, as shown in FIG. 6B. The protector 10 can be bent at two thin hinge sections 16. Thus, it is possible to attach the protector 10 to the vehicle body P in compliance with a shape of an attaching portion, thereby enhancing an attachment efficiency of the protector 10.

End edges 13b, 14b, 15b, 19c, 20b, and 21c are opposed to one another with respect to the thin hinge sections 16. The edges 13b, 14b, 15b, 19c, 20b and 21c are tapered to define spaces above the hinge sections 16. Thus, it is possible to prevent the opposed end edges 13b, 14b, 15b, 19c, 20b, and 21c from interfering with one another when the protector 10 is bent at the thin hinge sections 16. Also it is possible to increase a bending angle of the protector 10. Moreover, even if the protector 10 is attached to a vehicle body member having different shapes, the protector 10 can be bent at the thin hinge sections 16 to meet the different shapes of the vehicle body member, thereby decreasing different types of protectors.

Since the clips 12 can slide slightly in a longitudinal direction of the protector 10, it is possible to insert the clips 12 into engaging holes H1 and H2 in the vehicle body P while finely adjusting the position of the clips 12 to meet a distance between the holes H1 and H2. This absorbs dimension tolerances between the engaging holes H1 and H2. Accordingly, it is possible to further enhance the attachment efficiency of the protector 10 to the vehicle body P.

Figure 7:
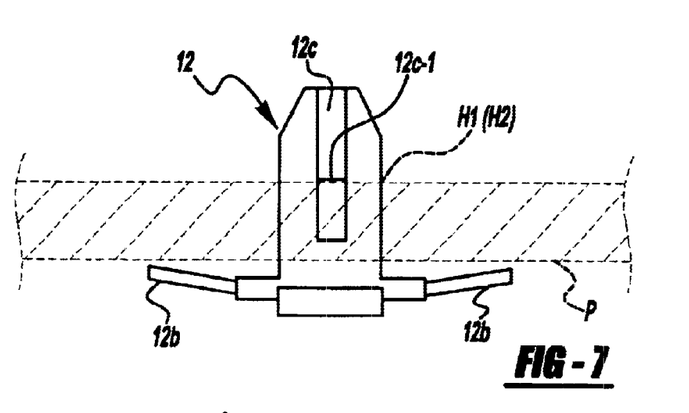
FIG. 7 is a side elevation view of the clip, illustrating the clip being engaged with the vehicle body.

The pair of elastic pieces 12b project from the base portion 12f of the clip 12. The clips 12 are inserted into the engaging holes H1 and H2 in the vehicle body P, as shown in FIG. 7. The engaging pawls 12c-1 of the engaging wings 12c elastically press front surfaces around the engaging holes H1 and H2. Thus, the protector 10 can be safely attached to the vehicle body P.

A fine adjustable attachment structure of the clip 12 can be applied to any protector that has no thin hinge section 16 or no lid section. The number of the thin hinge sections 16 provided in the protector may be set in accordance with a configuration of the vehicle body member.

Figure 8:
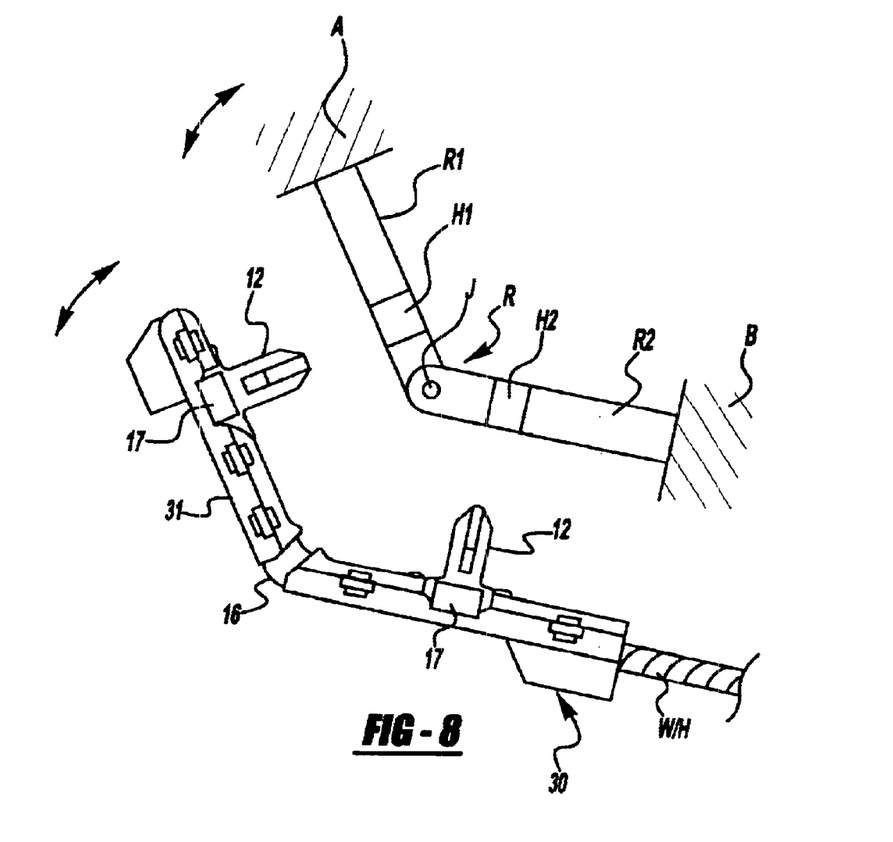
FIG. 8 is a second embodiment of a protector for a wire harness in accordance with the present invention, illustrating the protector being attached to a vehicle body.

FIG. 8 shows a second embodiment of a protector for a wire harness in accordance with the present invention.

The second embodiment differs from the first embodiment in that only one thin hinge section 16 is provided on the protector 30. Also, a vehicle body member, to which the clip 12 is attached, has a bendable link R.

The link R is connected between a stationary vehicle body element A and a movable element B relative to the vehicle body element A. A first arm R1 is flexibly coupled to a second arm R2 through a rotatable section J.

The protector 30 includes a protector body 31 and a thin hinge section 16 provided on a central bottom of the protector body 31 so that the protector 30 can be bent. Accordingly, when the clips 12 of the protector 30 are inserted into engaging holes H1 and H2 in the link R, the protector 30 can be bent in compliance with an action of the link R, even if the movable element B bends the link R.

Since the other structures of the second embodiment are the same as those of the first embodiment, they are omitted here.

From the above description of the invention, one skilled in the art will perceive improvements, changes and modifications. Such improvements, changes and modifications within the skill of the art are intended to be covered by the appended claims.

What is claimed is:

1. A protector for a wire harness to be secured to a vehicle body member by at least two clips, the wire harness being inserted into a protector body that is formed into a concave configuration cross section and has an opening at an upper side, comprising:

at least one of said clips being separate from the protector body, each of said clips includes a base plate, a pole projecting from said base plate, and a pair of engaging wings provided on the top of said pole, said protector body including guide frames on each of its opposite sidewalls, each having a U-shaped cross section; and said guide frames opposing one another, and the opposite ends of said base plate of one of said clips being slidably inserted into said guide frames so that said opposite ends close said opening in said protector body and said clip base plate being movable along said guide frames for adjusting a position of said clip with respect to an engaging hole in the vehicle body member for enabling said clip to compensate for misalignment of said protector on the vehicle body.

2. A protector for a wire harness according to claim 1 wherein said protector body includes a plurality of closing said opening lids integrally connected through thin hinges to said protector body, wherein said lids oppose said protector body when said lids are locked on said protector body so that clearances are defined between said base plates of said clips and said lids to enable said base plates to move in said guide frames, and said lids serve as stoppers for said base plates of said clips moving in said guide frames.

3. A protector for a wire harness according to claim 2 wherein each of said base plates of said clips includes a protrusion on the bottom surface that comes into a point contact with a lower surface of each of said guide frames so that said clips can move in said guide frames in a point contact manner.

4. A protector for a wire harness according to claim 2 wherein said guide frames are tapered at their inlet port sides for preventing said base plate of each of said clips from coming out of the guide frames in a horizontal direction.

5. A protector for a wire harness according to claim 2 wherein said protector body includes a plurality of thin hinge sections on a bottom wall, said plurality of thin hinge sections being spaced away from one another in a longitudinal direction, wherein said protector body can be bent at said thin hinge sections, and said clips are disposed between said thin hinge sections on said protector body.

6. A protector for a wire harness according to claim 2 wherein said vehicle body member for supporting said clips includes a stationary element, a movable element relative to said stationary element, and a bendable link connected between said stationary element and said movable element, and a thin hinge section included on said protector body to be bent in compliance with movement of said link.

7. A protector for a wire harness according to claim 1 wherein each of said base plates of said clips is provided on a bottom surface with a protrusion that comes into a point contact with a lower surface of each of said guide frames so that said clips can move in said guide frames in a point contact manner.

8. A protector for a wire harness according to claim 1 wherein said guide frames are tapered at their inlet port sides for preventing said base plate of each of said clips from coming out of the guide frames in a horizontal direction.

9. A protector for a wire harness according to claim 1 wherein said protector body includes a plurality of thin hinge sections on a bottom wall, said plurality of thin hinge sections being spaced away from one another in a longitudinal direction, wherein said protector body can be bent at said thin hinge sections, and said clips are disposed between said thin hinge sections on said protector body.

10. A protector for a wire harness according to claim 1 wherein said vehicle body member for supporting said clips includes a stationary element, a movable element relative to said stationary element, and a bendable link connected between said stationary element and said movable element, and a thin hinge section included on said protector body to be bent in compliance with movement of said link.

* * * * *